United States Patent [19]
Asahina et al.

[11] Patent Number: 5,817,732
[45] Date of Patent: Oct. 6, 1998

[54] BLOCKED POLYISOCYANATE AND COATING COMPOSITION

[75] Inventors: Yoshiyuki Asahina; Taketoshi Usui, both of Nobeoka, Japan

[73] Assignee: Asahi Kasei Kogyo Kabushiki Kaisha, Osaka, Japan

[21] Appl. No.: 727,134

[22] Filed: Oct. 8, 1996

Related U.S. Application Data

[63] Continuation of Ser. No. 244,961, Jun. 14, 1994, abandoned.

[30] Foreign Application Priority Data

Feb. 12, 1993 [JP] Japan .................................. 5-024151

[51] Int. Cl.$^6$ .................................................. C08G 18/80
[52] U.S. Cl. ............................ 528/45; 528/73; 524/710; 524/728
[58] Field of Search ........................... 252/182.2, 182.22; 544/222; 528/45, 73; 524/710, 728

[56] References Cited

U.S. PATENT DOCUMENTS

| | | | |
|---|---|---|---|
| 4,150,211 | 4/1979 | Müller et al. .............................. | 528/45 |
| 4,604,418 | 8/1986 | Shindo et al. ........................... | 524/296 |
| 4,647,623 | 3/1987 | Kase et al. ............................... | 525/123 |
| 4,696,991 | 9/1987 | Kobayashi et al. ....................... | 528/45 |
| 4,801,663 | 1/1989 | Ueyanagi et al. ....................... | 525/528 |
| 4,855,383 | 8/1989 | Dammann et al. ....................... | 528/51 |
| 5,076,958 | 12/1991 | Pedain et al. ........................ | 252/182.2 |
| 5,216,078 | 6/1993 | Cook et al. ............................. | 525/124 |

FOREIGN PATENT DOCUMENTS

| | | |
|---|---|---|
| 0 154678 | 9/1985 | European Pat. Off. . |
| 1411633 | 8/1965 | France . |
| 30 04 876 A1 | 8/1981 | Germany . |
| 54-63134 | 5/1979 | Japan . |
| 57-47321 | 3/1982 | Japan . |
| 59-22916 | 2/1984 | Japan . |
| 61-42523 | 3/1986 | Japan . |
| 61-72012 | 4/1986 | Japan . |
| 61-72013 | 4/1986 | Japan . |
| 62-53975 | 3/1987 | Japan . |
| 62-215619 | 9/1987 | Japan . |
| 63-056557 | 3/1988 | Japan . |
| 63-93770 | 4/1988 | Japan . |
| 63-96178 | 4/1988 | Japan . |
| 64-33115 | 2/1989 | Japan . |
| 2-110123 | 4/1990 | Japan . |
| 1086091 | 10/1967 | United Kingdom . |
| 1412432 | 11/1975 | United Kingdom . |

OTHER PUBLICATIONS

Asahi, Derwent 88–152072/22, Oct. 1986.
Asahi, Derwent, 88–287951/41, Apr. 1987.
Asahi, Derwent, 88–295259/42, Oct. 1986.
Ashai, Derwent, 90–168387/22, Oct. 1988.
Bayer, Derwent, 62071A/35, Feb. 1977.
Chem Werke Huls, Derwent, 62417 D/35, Feb. 1980.
Dainippon, Derwent, 86–083128/13, Sep. 1984.
Dainippon, Derwent, 86–134814/21, Sep. 1984.
Dainippon, Derwent, 87–304355/43, Mar. 1986.
Mitsubishi, Derwent, 87–073915/11, Aug. 1985.
Mitsui, Derwent 86–097537/15, Aug. 1984.
Nippon, Derwent 33830 E/17, Sep. 1980.
Nippon, Derwent 84–066310/11, Jul. 1982.
Sasaki, Yokoyama, and Tanaka; *Properties of Isocyanurate–Type Crosslinked Polyurethanes;* Journal of Polymer Science: Polymer Chemistry Edition; vol. II, 1973; pp. 1765–1779;.

*Primary Examiner*—Rachel Gorr
*Attorney, Agent, or Firm*—Pennie & Edmonds LLP

[57] ABSTRACT

A thermally dissociative blocked polyisocyanate, wherein an isocyanate group of the polyisocyanate is protected with a thermally dissociative blocking agent, which polyisocyanate is a urethane-modified isocyanurate polyisocyanate, (1) that is obtained by a cyclic-trimerization of at least one aliphatic or alicyclic diisocyanate either after its reaction with or in the presence of a polyhydric alcohol having a valence of at least 3, (2) of which the average number of isocyanate functional groups in said polyisocyanate is in the range of 4.5 to 10, and (3) the viscosity of which measured at 25° C. substantially in the absence of the aliphatic or alicyclic diisocyanate monomer and a solvent thereof is in the range of 5,000 to 100,000 mPa·s;

a thermosetting hardener composition; and
a thermosetting one-pack coating composition comprising the blocked polyisocyanate.

The hardener compositions can be used as adhesives, adhesion-imparting agents, sealing agents, and so on, and the coating compositions prepared from the blocked product or hardener compositions can be used as topcoats or intercoats for automobiles, chip-resistant coatings, coatings for automobile parts, coatings for precoated metals and anticorrosive steel plates of metallic articles such as appliances and business machines, coatings for building materials, coatings for plastics, adhesion imparting agents, sealing agents, and electrodeposition coatings.

17 Claims, No Drawings

BLOCKED POLYISOCYANATE AND COATING COMPOSITION

This is a continuation, of application Ser. No. 08/244,961, filed Jun. 14, 1994, now abandoned.

TECHNICAL FIELD

The present invention relates to a novel polyisocyanate, a novel blocked polyisocyanate, and a thermosetting type hardener composition and a thermosetting type coating composition using the same.

BACKGROUND ART

Polyurethane resin coating compositions have very excellent wear resistance, chemical resistance, and stain resistance. Furthermore, polyurethane resin coating compositions comprising, as a hardener, a non-yellowing polyisocyanate derived from aliphatic diisocyanates, especially hexamethylene diisocyanate, or from alicyclic diiscyanates, especially isophorone diisocyanate, are also excellent in weathering resistance. Therefore, demand for these coating compositions tends to increase.

However, polyurethane resin coating compositions are generally two-pack type and are extremely inconvenient for use. That is, a conventional urethane resin coating composition is constituted of two components, a polyol and a polyisocyanate, which are separately stored and which must be mixed at the time of coating. Furthermore, once they are mixed, the coating composition sets to gel in a short time and therefore can no longer be used. This makes it very difficult to attain automation in the field of on-line coatings such as precoating and postcoating, for instance, spray coating, dip coating, roll coating, and electrodepsition coating which are applied to metallic articles and plastic molded articles in automobiles, appliances, business machines and building construction, including rust protected steel sheets, and in the fields of adhesives, adhesion imparting agents, and sealing agents containing polyisocyanates.

Moreover, it is necessary to sufficiently clean spray guns and equipment used therewith and coating pans or vessels after completion of the coating operation, causing much reduction of operating efficiency. In order to overcome these defects, it has been proposed to employ blocked polyisocynates wherein active isocyanate groups are all blocked with a blocking agent. The blocked polyisocyanates do not react with polyols at room temperature, but they dissociate the blocking agent at baking temperatures to regenerate the active isocyanate groups which react with polyols to bring about a crosslinking reaction. Therefore, the above defects seems to be tentatively overcome.

However, the crosslinking reaction requires a high baking temperature such as 150°–200° C. Use of the high baking temperature causes increase of energy cost and increase of atmospheric pollution, and in addition causes, when coated on, serious defects in the materials such as plastics which are susceptible to heat.

Under the circumstances, appearance of one-pack type polyurethane resin coating compositions excellent in weathering resistance and low in baking temperature has been desired in the field of polyurethane resin coating compositions.

Some proposals have been made to lower the baking temperature. Japanese Patent Publication Examined No. 44('69)-18877 and Japanese Patent Publication Unexamined No. 53('78)-138434 disclose the addition of specified stannoxane type organotin compounds, U.S. Pat. No. 4,322,519 discloses the addition of dialkyl and diaryl tin compounds or a specified organotin monocarboxylates. Japanese Patent Publication Unexamined No. 62('87)-199609 discloses the addition of lead compounds or inorganic zinc compounds as a hardening accelerator.

According to these methods of adding the specified heavy metal additives, the decrease in baking temperature is insufficient and does not satisfy the baking temperature of, for instance, 120° C. which is the lower curing temperature of coating compositions for automobiles. Therefore, use of the blocked isocyanate is restricted.

Furthermore, coats formed at a high baking temperatures of, for example, 160° C. using a conventional blocked isocyanate show yellowing, considerably damaging the appearance of the coats.

DISCLOSURE OF INVENTION

The purpose of the present invention is to provide a specified polyisocyanate and a specified thermally dissociative blocked polyisocyanate which are derived from aliphatic or alicyclic isocyanates, a thermosetting type hardener composition containing the polyisocyanate and a thermosetting type coating composition which employs at least one of them, which is excellent in weathering resistance, baking of which at a low temperature of 120° C. is possible, and which is excellent in yellowing resistance of a coating film thereof at a high temperature of 160° C.

As a result of intensive research conducted by the inventors, it has been found that the above purpose can be attained by employing a blocked polyisocyanate prepared by blocking a specified polyisocyanate (hereinafter referred to as "highly branched polyisocyanate") with a thermally dissociative blocking agent. Thus, the present invention has been accomplished.

That is, the present invention provides a polyisocyanate which is an urethane-modified isocyanurate type polyisocyanate, (1) which is obtainable by a cyclic-trimerization of at least one aliphatic or alicyclic diisocyanate either after its reaction with or in the presence of a polyhydric alcohol, (2) of which the average number of functional groups of an isocyanate is in the range of 4.5 to 10, and (3) the viscosity of which measured at 25° C. substantially in the absence of the aliphatic or alicyclic diisocyanate monomer and a solvent thereof is in the range of 5,000 to 100,000 mPa·s, and a thermally dissociative blocked polyisocyanate wherein an isocyanate group of said polyisocyanate is protected with a thermally dissociative blocking agent.

The present invention further provides a thermosetting hardener composition and a thermosetting one-pack type coating composition both of which contain said blocked polyisocyanate.

BEST MODE FOR CARRYING OUT THE INVENTION

The present invention is explained in detail below.

First, the polyisocyanate and thermally dissociative blocked polyisocyanate of the present invention is explained.

The diisocyanate used as a starting material in the present invention is an aliphatic or alicyclic diisocyanate. The aliphatic diisocyanate is preferably one having 4 to 30 carbon atoms and the alicyclic diisocyanate is preferably one having 8 to 30 carbon atoms. They include, for example, 1,4-tetramethylene diisocyanate, 1,5-pentamethylene diisocyanate, 1,6-hexamethylene diisocyanate, 2,2,4-trimethyl-1,6-hexamethylene diisocyanate, lysine diisocyanate, isophorone diisocyanate, 1,3-bis (isocyanatomethyl)-cyclohexane, and 4,4'-dicyclohexylmethane diisocyanate. More preferred are aliphatic diisocyanates having 4 to 20 carbon atoms and alicyclic diisocyanates having 8 to 20 carbon atoms. From the viewpoint of weathering resistance and easiness in industrial availability, especially preferred are 1,6-hexamethylene diisocyanate (hereinafter referred to as "HMDI") and isophorone diisocyanate (hereinafter referred to as "IPDI"). These diisocyanates may be used singly or in combination.

The highly branched polyisocyanate of the present invention obtainable using the above-described diisocyanates is obtainable merely by reacting diisocyantes with polyhydric alcohols having a valence not lower than 3. However, preferred is a urethane-modified isocyanurate type polyisocyanate obtainable by reacting a diisocyanate with a polyhydric alcohol and further carrying out a cyclic-trimerization of the isocyanate, in other words, a isocyanuration reaction. Concerning these techniques, U.S. Pat. No. 5,076,958 discloses a diol produced from a diol and ε-caprolactone, U.S. Pat. No. 4,789,705 discloses a polyester polyol comprising 1,2-hydroxystearic acid as a constituent, Japanese Patent Publication Unexamined No. 1('89)-297420 discloses a polyester polyol obtained from a diol and/or a triol and a carboxylic acid, and U.S. Pat. No. 4,604,418 discloses use of a polyol having a functionality of 2 to 3. However, these patent publications fail to disclose the highly branched polyisocyanate and the blocked polyisocyanate thereof having a high average number of functional groups as specified in the present invention, and make no suggestion of one-pack type coating composition containing them as a hardener and of its excellent low-temperature curability.

The polyhydric alcohol in the present invention is preferably an alcohol having a valence not lower than 3. Low-molecular weight polyhydric alcohols include, for example, trimethylolpropane, glycerin, 1,1,7-trimethylolheptane, 1,2,7-trimethylolheptane and pentaerythritol, and high-molecular weight polyhydric alcohols include, for example, aliphatic hydrocarbon polyols, polyether polyols, polyester polyols and epoxy resins.

Examples of the aliphatic hydrocarbon polyols include polybutadienes having terminal hydroxyl groups, a hydrogenated product thereof, etc. Examples of the polyether polyols include polyether polyols obtainable by addition-reacting one or more of alkylene oxides such as ethylene oxide and propylene oxide with one or more polyhydric alcohols such as glycerin and propylene glycol; polytetramethylene glycols; polyether polyols obtainable by reacting alkylene oxides with polyfunctional compounds such as ethylenediamine and ethanolamines; and so-called polymer polyols obtainable by polymerization of acrylamide, etc. using the above-described polyethers as a medium.

The polyester polyols are exemplified by polyester polyol resins obtainable by condensation reaction of one or more dibasic acids selected from the group consisting of carboxylic acids such as succinic acid, adipic acid, sebacic acid, dimer acid, maleic anhydride, phthalic anhydride, isophthalic acid, and terephthalic acid with one or more polyhydric alcohols selected from the group consisting of ethylene glycol, propylene glycol, diethylene glycol, neopentyl glycol, trimethylolpropane, glycerine, and the like, and exemplified by polycaprolactone polyols obtainable, for example, by ring opening polymerization of ε-caprolactone using polyhydric alcohols.

The epoxy resins are exemplified by novolak type, β-methylepichlorohydrin type, cyclic oxirane type, glycidyl ether type, glycol ether type, epoxy type of aliphatic unsaturated compound, epoxidated fatty acid ester type, polycarboxylic acid ester type, aminoglycidyl type, halogenated type and resorcin type epoxy resins.

Of these polyols, preferred are the foregoing low-molecular weight polyhydric alcohols, polyether polyols, aliphatic hydrocarbon polyols, and polyester polyols, respectively, having 2 to 6, more preferably 3 to 5 hydroxyl groups in one molecule. Especially preferred are polycaprolactone polyols having a number-average molecular weight of 250 to 2000. These may be used singly or by combining two or more types thereof.

The amount of the polyol used is 3 to 50 parts by weight, preferably 5 to 30 parts by weight, based upon 100 parts by weight of the diisocyanate.

The reaction of the diisocyanate with the polyol to form a urethane linkage may be carried out before the isocyanuration reaction or simultaneously with the isocyanuration reaction.

Catalysts are normally used for the isocyanuration reaction. The catalysts used are generally preferably basic catalysts, exemplified by salts, for instance, with organic weak acids or hydroxides, of quaternary ammoniums such as trimethylhydroxyammonium, triethylhydroxyammonium, tetramethylammonium, and tetraethylammonium, alkyl metal salts, for instance, those of alkylcarboxylic acids such as acetic acid and caproic acid with tin, zinc, lead, or the like, alcoholates of metals such as sodium and potassium, and silylamino group-containing compounds such as hexamethyldisilazane, etc. Concentration of the catalyst is generally adopted from the range of 10 ppm to 1.0% by weight based upon the isocyanate compound, depending upon the course of the reaction. When the concentration is lower than 10 ppm, the reaction rate is low; and on the other hand, when it is higher than 1.0% by weight, there is a possibility of the product being adversely affected.

The reaction can be carried out with or without using a solvent. When the solvent is used, it must be inert to the isocyanate group.

The reaction temperature should generally be in the range of 20° to 160° C., preferably 40° to 130° C. The end point of the reaction is a point of time when the yield becomes 30 to 75% although it varies depending upon the type of polyhydric alcohol used. When the yield is lower than 30%, the range of the average number of functional groups according to the present invention cannot be satisfied. It is very difficult to obtain a yield exceeding 75%.

When the reaction proceeds to reach the desired yield, the catalyst is deactivated, for instance, with sulfonic acid, phosphoric acid, phosphates, etc., and then the reaction is stopped.

The unreacted diisocyanate and the solvent are removed and thus, a highly branched polyisocyanate having an isocyanurate structure can be obtained.

The viscosity of the highly branched isocyanate containing no solvent should be in the range of 5000 to 100,000 mPa·s at 25° C. When the viscosity exceeds 100,000 mPa·s, the appearance of the coating film is sometimes adversely affected, and on the other hand when it is lower than 5000 mPa·s, the range of the average number of the functional groups of an isocyanate according to the present invention cannot be satisfied.

The average number of functional groups of an isocyanate in a polyisocyanate means the number of the functional groups of an isocyanate which one molecule of the polyisocyanate statistically contains, and can be calculated by the following general formula (1) from the number-average molecular weight of the polyisocyanate and the part by weight of the isocyanate functional groups contained in 1 part by weight of the polyisocyanate (hereinafter referred to as "isocyanate concentration").

The average number of functional groups of the blocked polyisocyanate is the same as the average number of the functional groups calculated in the same manner as above from the polyisocyanate which is a precursor of the blocked polyisocyanate.

$$\text{The average number of functional groups of polyisocyanate} = \frac{\left[\begin{array}{c}\text{Number-average molecular}\\\text{weight of polyisocyanate}\end{array}\right] \times [\text{Isocyanate concentration}]}{\text{Formula weight of isocyanate (42)}} \quad (1)$$

Concerning the average number of the isocyanate functional groups of polyisocyanates, Japanese Patent Publication Unexamined No. 61('86)-12678 discloses the number average molecular weight and the isocyanate concentration of a polyisocyanate prepared by modifying an isocyanurate type polyisocyanate with a specified diol, and U.S. Pat. No. 5,017,655 discloses those of an isocyanurate type polyisocyanate derived from hexamethylene diisocyanate which is an aliphatic isocyanate. When the average number of isocyanate functional groups is calculated from these values according to the formula (1), the maximum value is 3.6. Furthermore, the average number of functional groups of commercially available aliphatic polyisocyanates such as Desmodur N, Sumidur N3500, Coronate HX, Duranate 24A, and Duranate TPA is approximately in the range of 3.2 to 4.2. European Patent Publication Unexamined No. 154678 discloses a specific polyisocyanate structure, the number of isocyanate groups in one molecule of the polyisocyanate obtained from the structure being 3 to 6. However, these polyisocyanates having the value of not lower than 4 are inferior in durability because they contain aromatic isocyanates.

The average number of functional groups of an isocyanate of the highly branched polyisocyanate of the present invention is in the range of 4.5 to 10. When the average number of functional groups is lower than 4.5, curability at a low-temperature baking is inferior; on the other hand, when it is higher than 10, compatibility with polyols decreases. The average number of functional groups is preferably in the range of 5 to 8.

The blocking agents of the present invention for obtaining the thermally dissociative blocked isocyanate include exemplarily compounds of phenol derivatives, active methylene derivatives, mercaptan derivatives, acid amide derivatives, acid imide derivatives, imidazole derivatives, urea derivatives, oxime derivatives, amine derivatives and imine derivatives, and hydrogensulfites. These may be used singly or by combining them. Examples of the blocking agents are shown below.

(1) Phenol derivatives: phenol, cresol, ethylphenol, butylphenol, nonylphenol, dinonylphenol, styrenated phenol, hydroxybenzoic acid esters, etc.

(2) Active methylene derivatives: dimethyl malonate, diethyl malonate, methyl acetoacetate, ethyl acetoacetate, acetylacetone, etc.

(3) mercaptan derivatives: butyl mercaptan, dodecyl mercaptan, etc.

(4) Acid amide derivatives: acetanilide, acetic amide, $\epsilon$-caprolactam, $\delta$-valerolactam, $\gamma$-butyrolactam, etc.

(5) Acid imide derivatives: succinic imide, maleic imide, etc.

(6) Imidazole derivatives: imidazole, 2-methylimidazole, etc.

(7) Urea derivatives: urea, thiourea, ethyleneurea, etc.

(8) Oxime derivatives: formaldoxime, acetaldoxime, acetoxime, methyl ethyl ketoxime, cyclohexanone oxime, etc.

(9) Amine derivatives: diphenylamine, aniline, carbazole, etc.

(10) Imine derivatives: ethyleneimine, polyethyleneimine, etc.

(11) Hydrogensulfites: sodium hydrogensulfite, etc.

Phenols, oximes, and acid amides are preferred, and especially preferred are nonylphenol, styrenated phenol, hydroxybenzoic acid esters, acetoxime, methyl ethyl ketoxime, and $\epsilon$-caprolactam.

The thermally dissociative blocked polyisocyanates can be obtained by reacting the above-described blocking agents with the highly branched polyisocyanate.

The reaction of the isocyanate with the blocking agent can be conducted in the presence or absence of a solvent. When a solvent is used, it must be inert to the isocyanate group.

In the reaction of the isocyanate with the blocking agent, an organometallic salt such as of tin, zinc, lead, etc. or a tertiary amine may be used as a catalyst.

The reaction can be carried out generally in the range of $-20°$ C. to $150°$ C., preferably $0°$ C. to $100°$ C. When the temperature exceeds $150°$ C., there is a possibility of a side-reaction taking place, and on the other hand when it is lower than $-20°$ C., the reaction rate becomes low which is disadvantageous.

Next, the hardener composition of the present invention is explained.

The hardener composition of the present invention containing the thermally dissociative blocked isocyanate obtainable from the above-described highly branched polyisocyanate or containing the following compound in addition to the highly branched polyisocyanate can afford low-temperature hardenability and furthermore low yellowing of coating film when baked at high temperatures.

The compounds having the carbazoyle (hydrazide) group represented by the following structural formula (1) or the semicarbazide group represented by the following structural formula (2) which are used as Component (a) in the hardener composition of the present invention are explained.

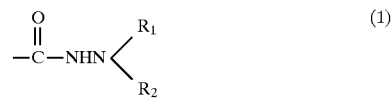

(wherein $R_1$ and R2 represent the same or different alkyl group or substituted alkyl group, and $R_1$ and $R_2$ may be linked to form an identical ring).

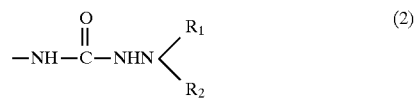

(wherein $R_1$ and R2 represent the same or different alkyl group or substituted alkyl group, and $R_1$ and $R_2$ may be linked to form an identical ring).

In this connection, U.S. Pat. No. 5,216,078 discloses a hydrazide type compound as one constituent of a coating composition containing blocked polyisocyanates, but it provides neither a description nor any suggestion of combination of the hydrazide with the thermally dissociative blocked polyisocyanate obtainable from the highly branched polyisocyanate of the present invention. Furthermore, the coating composition is inferior in hardenability at low temperatures.

The compound having the carbazoyle group represented by the structural formula (1) as used in the present invention is obtainable for instance by reacting a carboxylic acid chloride of, for example, acetic acid, propionic acid, butyric acid, or valeric acid with an N,N-disubstituted hydrazine or by an ester interchange reaction of a carboxylic acid ester such as ethyl acetate, butyl acetate, or methyl propionate with an N,N-disubstituted hydrazine. The compound having the semicarbazido group represented by the structural formula (2) is obtainable for instance by reacting an isocyanate compound with an N,N-disubstituted hydrazine. The N,N-disubstituted hydrazine is exemplified by N,N-dimethylhydrazine, N,N-diethylhydrazine, N,N-dipropylhydrazine, N,N-diisopropylhydrazine, N,N-distearylhydrazine, N-methyl-N-ethylhydrazine, N-methyl-N-isopropylhydrazine, N-methyl-N-benzylhydrazine, and N,N-di($\beta$-hydroxyethyl)-hydrazine. The total number of carbon atoms therein is preferably about 20 or less. When the number of carbon atoms is too high, the proportion occupied by the hydrazine residue increases, so that not only is addition thereof in a large amount necessary for stabilization, but also the compatibility thereof with the polyhydroxy compound sometimes decreases. Preferred are hydrazines substituted with an alkyl group of 4 or less carbon atoms. N,N-dimethylhydrazine is especially preferable. These N,N-disubstituted hydrazines may be used singly or by combining at least two types of them. The isocyanate compound is exemplified by an aliphatic or alicyclic diisocyanate such as 1,4-tetramethylene diisocyanate, 1,5-pentamethylene diisocyanate, HMDI, 2,2,4 (or 2,4,4)-trimethyl-1,6-hexamethylene diisocyanate, lysine diisocyanate, IPDI, 1,3-bis(isocyanatomethyl)-cyclohexane, 4,4'-dicyclohexylmethane diisocyanate, xylylene diisocyanate and tetramethylxylene diisocyanate, an aromatic diisocyanate such as 4,4'-diphenylmethane diisocyanate, 1,4-phenylene diisocyanate, 2,4-tolylene diisocyanate and naphthalene diisocyanate, a polyisocyanate derived from these diisocyanates, and a monoisocyanate such as n-butyl isocyanate, n-hexyl isocyanate, n-octyl isocyanate, and phenyl isocyanate. The polyisocyanate derived from the diisocyanates includes exemplarily an isocyanurate-modified polyisocyanate, a biuret-modified polyisocyanate, an urethane-modified polyisocyanate, and the above-described highly branched polyisocyanate.

Of these isocyanate compounds, preferred are aliphatic or alicyclic diisocyanates and polyisocyanates derived therefrom. These isocyanate compounds may be used in combination of at least two types of them. When the polyisocyanate is used as the isocyanate, a part of the isocyanate groups may form semicarbazido groups or all of the isocyanate groups may form semicarbazido groups. When only a part of the isocyanate groups form semicarbazido groups, the remainder isocyanate groups can form a blocked isocyanate with a blocking agent.

The reaction between the isocyanate compound and the N,N-disubstituted hydrazine can be carried out with or without a solvent. When a solvent is used, the solvent must be inert to the isocyanate. The reaction is generally carried out in the range of −20° C. to −150° C., preferably in the range of 0° C to 100° C. When the temperature exceeds 150° C., there is a possibility of a side-reaction taking place and on the other hand when it is lower than −20° C., the reaction rate becomes unfavorably low.

The reaction between the isocyanate compound and the N,N-disubstituted hydrazine and the reaction between the isocyanate and the blocking agent may be carried out in any sequence.

The carbazoyl group-containing compound or the semicarbazido group-containing compound is added in an amount of 0.01 to 20 parts by weight, preferably 0.05 to 10 parts by weight, to 100 parts by weight of the thermally dissociative blocked polyisocyanate. When the amount is smaller than the above-described range, the effect is insufficient; on the other hand, when it is larger, good coating film properties sometimes are not exhibited.

Any divalent tin compound can be used as Component (b), and either organic compounds or inorganic compounds thereof may be used. The divalent organotin compounds include, for example, stannous carboxylate compounds, stannous sulfonate, alkyl stannous compounds, and alkyl ether stannous compounds.

The stannous carboxylate compound includes exemplarily stannous formate, stannous acetate, stannous propionate, stannous butyrate, stannous isobutyrate, stannous valerate, stannous isovalerate, stannous 2-methylbutanoate, stannous pivalate, stannous hexanoate, stannous 4-methylpentanoate, stannous 2-ethylbutanoate, stannous 2,2-dimethylbutanoate, stannous heptanoate, stannous 2-ethylhexanoate, stannous octanoate, stannous nonanoate, stannous decanoate, stannous undecanoate, stannous dodecanoate, stannous tetradecanoate, stannous hexadecanoate, stannous heptadecanoate, stannous octadecanoate, stannous eicosanoate, stannous docosanoate, stannous hexacosanoate, stannous triacontanoate, stannous acrylate, stannous crotonate, stannous isocrotonate, stannous 3-butenoate, stannous methacrylate, stannous angelate, stannous oxalate, stannous malonate, stannous succinate, stannous glutarate, stannous adipate, stannous suberate, stannous azelate, stannous sebacate, and stannous maleate.

The stannous sulfonates include, for example, stannous sulfamate.

The alkyltin (II) includes, for example, diethyltin, di-n-propyltin, diisopropyltin, di-n-butyltin, and diisobutyltin.

The alkyl ether tin (II) includes, for example, diethoxytin, di-n-butoxytin, and diisobutoxytin.

The inorganic compounds of divalent tin include, for example, stannous chloride, stannous bromide, stannous iodide, stannous hydroxide, stannous sulfide, stannous monohydrogenphosphate, stannous dihydrogenphosphate, stannous sulfate, and stannous oxide.

Preferred are organo-tins (II) and more preferred are stannous carboxylates.

The amount of the divalent tin compound used should be in the range of 0.01 to 20 parts by weight, preferably 0.1 to 10 parts by weight, based on 100 parts by weight of the thermally dissociative blocked polyisocyanate.

The phosphite ester compound used as Component (c) in the present invention includes exemplarily dialkyl phosphite esters such as dilauryl hydrogenphosphite; diaryl phosphite esters such as diphenyl hydrogenphosphite; trialkyl phosphite esters such as triethyl phosphite, tris(2-ethylhexyl) phosphite, tridodecyl phosphite, tris(tridecyl) phosphite, tristearyl phosphite, distearylpentaerythritol diphosphite, trilauryl trithiophosphite and bis(tridecyl)pentaerythritol diphosphite; triaryl phosphite esters such as triphenyl phosphite and tris(nonylphenyl) phosphite; and trialkylaryl phosphite esters such as diphenylmono(2-ethylhexyl) phosphite, diphenylmonodecyl phosphite, diphenylmono(tridecyl) phosphite, tetraphenyldipropylene glycol diphosphite, tetraphenyltetra(tridecyl)pentaerythritol tetraphosphite, tetra (tridecyl)-4,4'-isopropylidenediphenyl phosphite, bis (nonylphenol)pentaerythritol diphosphite and tris(2,4-di-t-butylphenyl) phosphite. These may also be used in combination of at least two types thereof. The amount of the phosphite ester compound used should be in the range of 0.01 to 20 parts by weight, preferably 0.1 to 10 parts by weight, based upon 100 parts by weight of the thermally dissociative blocked polyisocyanate.

The thus obtained thermally dissociative blocked polyisocyanate or hardener composition of the present invention constitutes as a hardener component the main component of the coating composition which is further constituted of the polyhydroxy compound.

The polyhydroxy compound includes exemplarily aliphatic hydrocarbon polyols, polyether polyols, polyester polyols, epoxy resins, fluoropolyols, and acrylic polyols.

Examples of the aliphatic hydrocarbon polyols include a polybutadiene containing a terminal hydroxyl group and a hydrogenated product thereof. Examples of the polyether polyols include polyether polyols obtainable by addition-reacting alkylene oxides such as ethylene oxide and propylene oxide singly or as a mixture thereof with polyhydric alcohols such as glycerin and propylene glycol singly or as a mixture thereof, polytetramethylene glycols, polyether polyols obtainable by reacting alkylene oxides with polyfunctional compounds such as ethylenediamine and ethanolamine, and so-called polymer polyols obtainable by polymerizing acrylamide, etc. using these polyethers as media.

Examples of the polyester polyols include polyester polyol resins obtainable by condensation reacting dibasic acids selected from the group consisting of carboxylic acids such as succinic acid, adipic acid, sebacic acid, dimeric acid, maleic anhydride, phthalic anhydride, isophthalic acid, and terephthalic acid singly or in admixture with polyhydric alcohols selected from the group consisting of ethylene glycol, propylene glycol, diethylene glycol, neopentyl glycol, trimethylolpropane and glycerin singly or in admixture, and polycaprolactone polyols obtainable by a ring-opening polymerization of $\epsilon$-caprolactone using polyhydric alcohols.

The epoxy resins include, for example, those of novolak type, β-methylepichlorohidrin type, cyclic oxirane type, glycidyl ether type, glycol ether type, epoxy type of aliphatic unsaturated compound, epoxidated fatty acid ester type, polycarboxylic acid ester type, aminoglycidyl type, halogenated type and resorcin type, and the modified resins of these epoxy resins with amino compounds, polyamide compounds, etc.

The fluoropolyols include, for example, copolymers of fluoroolefins and any of cyclohexylvinyl ether, hydroxyalkylvinyl ethers, and vinyl esters of monocarboxylic acids as disclosed, for instance, in U.S. Pat. No. 4,345,057 and European Patent Publication Unexamined No. 180962.

The acrylic polyols include, for example, those which are obtainable by copolymerizing polymerizable acrylic monomers having one or more active hydrogens in one molecule with other monomers copolymerizable therewith. Examples of the acrylic monomers having one or more active hydrogens in one molecule include a single one or mixed monomers selected from the group consisting of acrylic acid esters having active hydrogen such as 2-hydroxyethyl acrylate, 2-hydroxypropyl acrylate, and 2-hydroxybutyl acrylate, methacrylic acid esters having active hydrogen such as 2-hydroxydiethyl methacrylate, 2-hydroxypropyl methacrylate, and 2-hydroxybutyl methacrylate, and (meth) acrylic acid esters having polyvalent active hydrogen such as acrylic acid monoesters or methacrylic acid monoesters of glycerin and acrylic acid monoesters or methacrylic acid monoesters of trimethylolpropane. Examples of the other monomers copolymerizable with said monomers include acrylic acid esters such as methyl acrylate, ethyl acrylate, isopropyl acrylate, n-butyl acrylate and 2-ethylhexyl acrylate, and methacrylic acid esters such as methyl methacrylate, ethyl methacrylate, isopropyl methacrylate, n-butyl methacrylate, isobutyl methacrylate, n-hexyl methacrylate, cyclohexyl methacrylate, lauryl methacrylate, and glycidyl methacrylate, etc. If necessary, a single one or a mixture of other polymerizable monomers, for example, unsaturated carboxylic acids such as acrylic acid, methacrylic acid, maleic acid and itaconic acid, unsaturated amides such as acrylamide, N-methylolacrylamide and diacetoneacrylamide, styrene, vinyltoluene, vinyl acetate, and acrylonitrile, may be additionally used in copolymerization.

Furthermore, it is possible to use acrylic polyol resins obtainable by copolymerizing polymerizable ultraviolet stable monomers as exemplified in U.S. Pat. No. 5,239,028 and Japanese Patent Publication Unexamined No. 3('91)-6273.

Of these polyols, especially preferred are acrylic polyols and polyester polyols having a hydroxyl value of 10 to 300 mg KOH/g, preferably 20 to 200 mg KOH/g, and a number-average molecular weight of 300 to 60,000, preferably 500 to 40,000. When the hydroxyl value is less than 10, the coating film obtained is low in crosslinking density and preferable mechanical properties of coating film cannot be afforded; on the other hand, when it is more than 300, the resultant coating film is unfavorably insufficient in flexibility. When the number-average molecular weight is outside the above-described range, good coating films cannot be obtained. An acid value should be in the range of 0 to 200 mg KOH/g. When the acid value exceeds 200 mg KOH/g, water resistance of the coating film unfavorably decreases.

The equivalent ratio of the blocked isocyanate groups in the thermally dissociative blocked polyisocyanate and the hydroxyl groups in the polyol which is a polyhydroxy compound in the coating composition of the present invention is determined depending upon the desired properties of the coating film, and is usually in the range of 0.5 to 1.5.

Melamine resins may be additionally used in the coating composition of the present invention for the purpose of diversification of the properties of the coating film. Examples of the melamine resins include hexamethoxymethylolmelamine, methylated and butylated melamines, and butylated melamines.

Moreover, depending upon the uses and purposes, various types of solvents and additives may be used. The solvents can be optionally selected, depending upon the uses and purposes, from the group consisting of hydrocarbons such as benzene, toluene, xylene, cyclohexane, mineral spirits, and naphtha, ketones such as acetone, methyl ethyl ketone, and methyl isobutyl ketone, esters such as ethyl acetate, n-butyl acetate, and cellosolve acetate and alcohols such as butanol and isopropyl alcohol. These solvents may be used singly or in combination of at least two types thereof.

As the additives, if necessary, hardening accelerators, for example, organometallic compounds such as those of tin, zinc, and lead, antioxidants such as hindered phenols, ultraviolet absorbers such as benzotriazole and benzophenone, pigments such as titanium oxide, carbon black, indigo, quinacridone, and pearl mica, metallic powder pigments such as aluminum, and rheology controlling agents such as hydroxyethylcellulose and urea compounds may be added.

The thus prepared coating composition can be coated by any customary coating methods such as spray coating, dip coating, roll coating, and electrodeposition coating.

The polyisocyanate and the blocked product thereof of the present invention are superior to conventional ones in compatibility with polyols, etc. The hardener compositions are improved in low-temperature curability, and the coating compositions employing them are superior not only in weathering resistance, but also in yellowing resistance at high temperature baking, in addition to the above-described properties.

Therefore, the hardener compositions can be used as adhesives, adhesion-imparting agents, sealing agents, etc. and the coating composition prepared by employing the above-described blocked products or the hardener compositions can be used as topcoats or intercoats of automobiles, chip resistant coatings, coatings for automobile parts, coatings for precoated metals and anticorrosive steel plates of metallic articles such as appliances and business machines, coatings for building materials, coatings for plastics, adhesion imparting agents, sealing agents, and electrodeposition coatings.

EXAMPLES

The present invention is explained in more detail by the following Examples, but is not to be construed as limited by the Examples.

Evaluations were conducted in the following manner.
(1) Measurement of the number-average molecular weight:

The number-average molecular weight is the weight based upon the weight of polystyrene as a standard measured by gel permeation chromatography using the following apparatus.

Apparatus: HLC-802A of Tosoh Corporation.
Column: One G1000HXL, one G2000HXL, and one G3000HXL respectively of Tosoh Corporation.
Carrier: Tetrahydrofuran
Detection: Differential refractometer
(2) Measurement of viscosity:
Viscosity was measured using Emila Rheometer at 25° C.
(3) Gel fraction:

A hardened coating film was dipped in acetone at 20° C. for 24 hours, and the weight of the undissolved portion based upon the weight of the film before dipping was calculated. The results are graded by the following criteria:

X: Less than 60%
Δ: Not less than 60% and less than 80%
○: Not less than 80% and less than 90%
◎: Not less than 90%

(4) Degree of yellowing Δb

The degree of yellowing is a difference (increment) in value b of the coating film before and after baking which was measured on an S and M Color Computer manufactured by Suga Test Instrument Co., Ltd. Evaluation was conducted in the following manner:

X: Not less than 1.5
Δ: Not less than 1 and less than 1.5
○: Not less than 0.7 and less than 1
◎: Less than 0.7

(5) Haze of coating film:

Haze of the coating film of 50μ thickness coated on a transparent glass sheet of 1 mm thickness was measured by a full automatic Digital Haze Computer HGM-2DP manufactured by Suga Test Instrument Co., Ltd. A haze of less than 0.5 is expressed by ○ and that of not less than 0.5 is expressed by X.

(6) Gloss of coating film:

Gloss of the coating film of 50μ thickness coated on a white tile was measured at an angle of 60° on an S and M Color Computer manufactured by Suga Test Instrument Co., Ltd. A gloss of not less than 95% is expressed by ○ and that of less than 95% is expressed by X.

Example 1
(Preparation of a highly branched polyisocyanate)

600 parts by weight of HMDI and 30 parts by weight of polyester polyol "Placcel 303" (a tradename of Daicel Chemical Industries, Ltd.), which is a trihydric alcohol, were charged into a four-necked flask equipped with a stirrer, a thermometer, a reflux condenser, a nitrogen introduction pipe, and a dropping funnel, and having a nitrogen atmosphere. The temperature in the reaction vessel was kept at 90° C. for 1 hour while stirring to effect urethane formation. Thereafter, the temperature in the reaction vessel was kept at 60° C. and tetramethylammonium caparate, which is an isocyanuration catalyst, was added thereinto. When the yield reached 48% by weight, phosphoric acid was added thereto to stop the reaction. The reaction mixture was filtered and then unreacted HMDI was removed using a wiped film evaporator. The resulting highly branched polyisocyanate had a viscosity of 9,500 mPa·s at 25° C., an isocyanate content of 19.2% by weight, a number-average molecular weight of 1100, and an average number of functional groups of 5.1.

Examples 2 to 9
(Preparation of highly branched polyisocyanates)

Highly branched polyisocyanates were prepared using the same apparatus as used in Example 1 under the conditions shown in Table 1. Properties of the resulting products are shown in Table 1.

Comparative Example 1

The procedure of Example 1 was carried out using the same apparatus as used in Example 1 under the conditions shown in Table 1. Properties of the resulting products are also shown in Table 1. When the polyhydric alcohol was not used, the highly branched polyisocyanate of the present invention could not be obtained.

Comparative Example 2

The procedure of Example 1 was carried out using the same apparatus as used in Example 1 under the conditions shown in Table 1. The concentration of isocyanate in the reaction mixture was 30.6% by weight. Properties of the resulting products are also shown in Table 1. When a dihydric alcohol was used, the highly branched polyisocyanate of the present invention could not be obtained.

Example 10
(Preparation of a thermally dissociative blocked polyisocyanate)

100 parts by weight of the highly branched polyisocyanate obtained in Example 1 and 35 parts by weight of xylene were charged into a four-necked flask equipped with a stirrer, a thermometer, a reflux condenser, a nitrogen introduction pipe, and a dropping funnel, and having a nitrogen atmosphere. While keeping the reaction temperature at 50° C. or lower, methyl ethyl ketoxime was added thereinto dropwise until the characteristic absorption band of isocyanate in the infrared absorption spectrum disappeared affording a thermally dissociative blocked polyisocyanate solution having a solid concentration of 80% by weight.

Examples 11 to 18
(Preparation of thermally dissociative blocked polyisocyanates)

Thermally dissociative blocked polyisocyanates having a solid concentration of 80% by weight were prepared in the same manner as in Example 10 except that the highly branched polyisocyanates obtained in Examples 2 to 9 were used.

Example 19
(Preparation of a compound containing a semicarbazido group)

100 parts by weight of IPDI and 465 parts by weight of propylene glycol monomethyl ether acetate were charged into a four-necked flask equipped with a stirrer, a thermometer, a reflux condenser, a nitrogen introduction pipe and a dropping funnel, and having a nitrogen atmosphere. While keeping the reaction temperature at 50° C. or lower, N,N-dimethylhydrazine was added thereinto dropwise until the characteristic absorption band of isocyanate in the infrared absorption spectrum disappeared affording a solution of a semicarbazido group-containing compound having a solid concentration of 25% by weight.

Comparative Example 3
(Preparation of a blocked polyisocyanate)

The procedure of Example 10 was repeated except that HMDI type polyisocyanate Duranate TPA-100 (a tradename of Asahi Kasei Kogyo Kabushiki Kaisha; having an average number of functional groups of isocyanate of 3.2 and a viscosity of 1400 mPa·s/25° C.) was used, affording a blocked polyisocyanate solution having a solid concentration of 80% by weight.

Comparative Example 4
(Preparation of a blocked polyisocyanate)

The procedure of Example 10 was repeated except that an HMDI type polyisocyanate "Sumidur N3500" (a tradename of Sumitomo Bayer Urethane Co., Ltd.; having an average number of functional groups of isocyanate of 3.3 and a viscosity of 2500 mPa·s/25° C.) was used, to afford a blocked polyisocyanate solution having a solid concentration of 80% by weight.

Comparative Example 5
(Preparation of a blocked polyisocyanate)

The procedure of Example 10 was repeated except that an HMDI type polyisocyanate Coronate HX (a tradename by Nippon Polyurethane Industry Co., Ltd.; having an average number of functional groups of isocyanate of 3.4 and a viscosity of 2000 mPa·s/25° C.) was used, to afford a blocked polyisocyanate solution having a solid concentration of 80% by weight.

Comparative Example 6
(Preparation of a blocked polyisocyanate)

The procedure of Example 10 was repeated except that the polyisocyanate obtained in Comparative Example 1 was used, thereby affording a blocked polyisocyanate solution having a solid concentration of 80% by weight.

Comparative Example 7
(Preparation of a blocked polyisocyanate)

The procedure of Example 10 was repeated except that an HMDI biuret type polyisocyanate Desmodur N-75 (a tradename of Bayer Aktien-Gesellschaft; having an average number of functional groups of isocyanate of 4.0) was used, affording a blocked polyisocyanate solution having a solid concentration of 80% by weight.

Example 20

The thermally dissociative blocked polyisocyanate obtained in Example 10 and an acrylic polyol, Acrydic A-801 (a tradename of Dainippon Ink & Chemicals Incorporated), were mixed so that the ratio of blocked isocyanate/a hydroxyl group (equivalent) was 1.0. Thereto were added a semicarbazido group-containing compound, HN-130 (a tradename of Japan Hydrazine Co., Ltd.; obtainable from HMDI and N,N-dimethylhydrazine), and dibutyltin dilaurate respectively in an amount of 0.5 part by weight based upon 100 parts by weight of the coating composition in solid content. Thereto was added as a thinner a mixture of ethyl acetate/toluene/butyl acetate/xylene/propylene glycol monomethyl ether acetate (weight ratio=30/30/20/15/5), and the viscosity of the resulting coating solution was adjusted to 20 seconds/20° C. by a viscosity adjustor Ford cup #4. The thus obtained coating solution was coated at a dry film thickness of 50 microns by an air spray gun. The coating films baked for 30 minutes in an oven maintained at 110° C. and 120° C. were used for measurement of a gel fraction, those baked for 30 minutes in an oven maintained at 160° C. (180° C. in Examples 22 to 25) were used for measurement of yellowing, and those baked for 30 minutes in an oven maintained at 140° C. were used for measurement of gloss and haze. The results of measurement of the properties are shown in Table 2.

Examples 21 to 28

The procedure of Example 20 was repeated except that the thermally dissociative blocked polyisocyanates obtained in Examples 11 to 18 were used and the additives, etc. shown in Table 2 were used. The properties of the resulting coating films are shown in Table 2.

Example 29

The procedure of Example 20 was repeated except that the compound obtained in Example 20 was used as the semicarbazido group-containing compound. The properties of the resulting coating film are shown in Table 2.

Example 30

The procedure of Example 20 was repeated except that a semicarbazido group-containing compound, HN-300 (a tradename of Japan Hydrazine Co., Ltd.); obtainable from an HMDI biuret type polyisocyanate and N,N-dimethylhydrazine) was used. The properties of the resulting coating film are shown in Table 2.

Example 31
(Preparation of a highly branched blocked polyisocyanate containing semicarbazido group)

100 parts by weight of the highly branched polyisocyanate obtained in Example 1 was charged in a four-necked flask equipped with a stirrer, a thermometer, a reflux condenser, a nitrogen introduction pipe and a dropping funnel, and having a nitrogen atmosphere. While maintaining the reaction temperature at 50° C. or lower, a mixture of 0.5 part by weight of N,N-dimethylhydrazine and 35 parts by weight of xylene was added thereto dropwise. After a lapse of 30 minutes from completion of the addition, while maintaining the reaction temperature at 50° C. or lower, methyl ethyl ketoxime was added dropwise until the characteristic band of isocyanate in the infrared absorption spectrum disappeared in order to obtain a solution of a thermally dissociative blocked polyisocyanate containing a semicarbazido group which had a solid concentration of 80% by weight.

Example 32

The procedure of Example 20 was repeated except that the thermally dissociative blocked polyisocyanate containing a semicarbazido group obtained in Example 31 was used as the thermally dissociative blocked polyisocyanate and the semicarbazido group-containing compound. The properties of the resulting coating film are shown in Table 2.

Example 33

The procedure of Example 20 was repeated except that a polyester polyol, Desmophen 670 (a tradename of Sumitomo Bayer Urethane Co., Ltd.; solid content: 80% by weight and hydroxyl group content: 3.4% by weight) was used in place of the acrylic polyol. The properties of the resulting coating film are shown in Table 2.

Comparative Examples 8 to 12

The procedure of Example 20 was repeated except that the blocked isocyanates obtained in Comparative Examples 3 to 7 were used without additives as shown in Table 2. The properties of the resulting coating films are shown in Table 2.

TABLE 1

| Example | Diisocyanate (wt. part) | Polyhydric alcohol (wt. part) | Conditions for urethanation | Conditions for isocyanuration | Yield (wt. %) | Viscosity mPa·S | Isocyanate concentration (wt. %) | Number-average molecular weight | Average number of functional groups |
|---|---|---|---|---|---|---|---|---|---|
| 1 | HMDI 600 | Placcel 303 30 | 90° C. × 1 hr. | 60° C. | 48 | 9500 | 19.2 | 1100 | 5.1 |
| 2 | HMDI 600 | Polyether polyol[1] 30 | 90° C. × 1 hr. | 60° C. | 49 | 32000 | 19.2 | 1120 | 5.1 |
| 3 | HMDI 600 | Polyether polyol[2] 45 | 90° C. × 1 hr. | 60° C. | 44 | 40000 | 19.0 | 1150 | 5.2 |
| 4 | HMDI 600 | Placcel 303 60 | 90° C. × 1 hr. | 90° C. | 47 | 20000 | 17.6 | 1450 | 6.1 |
| 5 | HMDI 600 | Placcel 303 60 | 90° C. × 1 hr. | 60° C. | 63 | 31000 | 17.5 | 1820 | 7.6 |
| 6 | HMDI 600 | Placcel 303 60 | 90° C. × 1 hr. | 60° C. | 49 | 21000 | 17.7 | 1560 | 6.6 |
| 7 | HMDI 600 | Placcel 303 45 | 90° C. × 1 hr. | 100° C. | 47 | 24000 | 17.5 | 1700 | 7.1 |
| 8 | HMDI 600 | Placcel E-496[3] 69 | 90° C. × 1 hr. | 80° C. | 48 | 34000 | 16.9 | 1390 | 5.6 |
| 9 | HMDI 600 | Trimethylol propane 69 | 90° C. × 1 hr. | 80° C. | 48 | 25000 | 19.9 | 1080 | 5.1 |
| Comp. Ex. 1 | HMDI 600 | None | — | 60° C. | 54 | 7000 | 20.5 | 860 | 4.2 |
| Comp. Ex. 2 | HMDI 600 | 1,3-butanediol 43 | 80° C. × 2 hrs. | 60° C. | 60 | 14000 | 17.8 | 990 | 4.2 |

Note:
[1]Tetrahydric alcohol, "Adeka Quadrol" (Tradename of Asahi Denka Kobgyo K.K.)
[2]Hexahydric alcohol, "Adeka Polyether" (Tradename of Asahi Denka Kogyo K.K.)
[3]Tetrahydric alcohol, Tradename of Daicel Chemical Indsutries, Ltd.

TABLE 2

| Ex. & Comp. Ex. | Hardener | Additive | Gel fraction 110° C. | Gel fraction 120° C. | Yellowing of coating film |
|---|---|---|---|---|---|
| Ex. 20 | Ex. 10 | HN-130 0.5 | ○ | ⊙ | ⊙ |
| Ex. 21 | Ex. 11 | None | ○ | ⊙ | ○ |
| Ex. 22 | Ex. 12 | HN-130 0.5 JP-304 0.1 | ○ | ⊙ | *1 ⊙ |
| Ex. 23 | Ex. 13 | JP-304 0.5 T2EH 0.2 | ○ | ⊙ | *1 ⊙ |
| Ex. 24 | Ex. 14 | HN-130 0.5 T2EH 0.5 | ○ | ⊙ | *1 ⊙ |
| Ex. 25 | Ex. 15 | JP-333E 0.5 HN-130 0.5 T2EH 0.2 | ○ | ⊙ | *1 ⊙ |
| Ex. 26 | Ex. 16 | HN-130 0.5 | ○ | ⊙ | ⊙ |
| Ex. 27 | Ex. 17 | None | ○ | ⊙ | ○ |
| Ex. 28 | Ex. 18 | None | ○ | ⊙ | ○ |
| Ex. 29 | Ex. 10 | *2 0.5 | ○ | ⊙ | ⊙ |

TABLE 2-continued

| Ex. & Comp. Ex. | Hardener | Additive | Gel fraction 110° C. | Gel fraction 120° C. | Yellowing of coating film |
|---|---|---|---|---|---|
| Ex. 30 | Ex. 10 | HN-300 0.5 | ○ | ⊙ | ⊙ |
| Ex. 32 | *3 | | ○ ⊙ | ⊙ | ⊙ |
| Ex. 33 | Ex. 10 | HN-130 0.5 | ○ | ⊙ | ⊙ |
| Comp. Ex. 8 | Comp. Ex. 3 | None | X | Δ | X |
| Comp. Ex. 9 | Comp. Ex. 4 | None | X | Δ | X |
| Comp. Ex. 10 | Comp. Ex. 5 | None | X | Δ | X |
| Comp. Ex. 11 | Comp. Ex. 6 | None | X | Δ | X |
| Comp. Ex. 12 | Comp. Ex. 7 | None | X | Δ | X |

Note:
(1) Coating film baking temperature
1) 110° C. and 120° C. for evaluation of gel fraction.
2) 160° C. (180° C. for *1) for evaluation of yellowing.
(2) The numeral in the "Additive" column shows parts by weight of solid content based upon 100 parts by weight of the coating resin.
(3): *2: The semicarbazido group-containing compound obtained in Example 19.
(4) **3: The semicarbazido group-containing thermally dissociative blocked polyisocyanate obtained in Example 31.
(5) Gloss was at least 95% and haze was less than 0.5 in all of Examples and Comparative Examples.
(6) HN-130, HN-300: Tradenames for semicarbazido group-containing compounds manufacture by Japan Bydrazine Co., Ltd.
JP-304, JP-323E: Tradenames for phosphite esters manufactured by Johoku Chemical Co., Ltd.
T2EH: Divalent tin compound (tin 2-ethylhexanoate)

Industrial Applicability

The polyisocyanate and the blocked product thereof of the present invention are superior to conventional ones in compatibility with polyols, the hardener composition is improved in low-temperature curability, and the coating composition employing them is superior not only in weathering resistance, but also in yellowing resistance at high temperature baking, in addition to the above-described properties.

Therefore, the hardener compositions can be used as adhesives, adhesion-imparting agents, sealing agents, etc., and the coating compositions prepared by employing the above-described blocked product or hardener compositions can be used as topcoats or intercoats for automobiles, chipping resistance coatings, coatings for automobile parts, coatings for precoated metals and anticorrosive steel plates of metallic articles such as appliances and business machines, coatings for building materials, coatings for plastics, adhesion imparting agents, sealing agents, and electrodeposition coatings. Thus, they are industrially useful.

We claim:

1. A thermosetting one-pack coating composition comprising:

(A) a main component which is a polyhydroxy compound having a number average molecular weight of from 300 to 60,000, a hydroxyl value of from 10 to 300 mg KOH/g and an acid value of from 0 to 200 mg KOH/g; and (B) a hardener component which comprises a thermally dissociative blocked polyisocyanate comprising a urethane-modified isocyanurate polyisocyanate having isocyanate groups protected with a thermally dissociative blocking agent,
      said urethane-modified isocyanurate polyisocyanate being obtained by a cyclic-trimerization of at least one diisocyanate selected from the group consisting of an aliphatic diisocyanate and an alicyclic diisocyanate, wherein said cyclic-trimerization of said diisocyanate is conducted either after a reaction of said diisocyanate with or in the presence of a polyhydric alcohol having a valence of at least 3,
      said urethane-modified isocyanurate polyisocyanate having the following properties:
      (1) a number average molecular weight of at least 1080,
      (2) an average number of isocyanate functional groups of from 4.5 to 10, and
      (3) a viscosity of from 5,000 to 100,000 mPa·s, as measured at 25° C., substantially in the absence of the aliphatic or alicyclic diisocyanate and a solvent therefor.

2. The thermosetting one-pack coating composition according to claim 1, which has a yellowing resistance.

3. The thermosetting one-pack coating composition according to claim 1, wherein said thermally dissociative blocking agent is at least one compound selected from the group consisting of nonylphenol, styrenated phenol, hydroxybenzoic acid ester, acetoxime, methyl ethyl ketoxime, dimethyl malonate, diethyl malonate, methyl acetoacetate, ethylacetoacetate, and ε-caprolactam.

4. The thermosetting one-pack coating composition according to claim 1, wherein the average number of isocyanate functional groups is from 5 to 8.

5. The thermosetting one-pack coating composition according to claim 1, wherein said polyhydric alcohol is in the form of a polyester polyol having a number average molecular weight of 250 to 2,000, which is derived from the polyhydric alcohol having a valence of at least 3 and ε-caprolactone.

6. The thermosetting one-pack coating composition according to claim 3, wherein said thermally dissociative blocking agent is methyl ethyl ketoxime.

7. The thermosetting one-pack coating composition according to claim 1, wherein said polyhydric alcohol having a valence of at least 3 is trimethylolpropane, a polyether polyol having 3 to 6 hydroxyl groups or a polyester polyol having 3 to 6 hydroxyl groups.

8. The thermosetting one-pack coating composition according to claim 1, wherein said diisocyanate is hexamethylenediisocyanate and said polyhydric alcohol having a valence of at least 3 is a polyester triol, a tetrahydric polyester, a tetrahydric polyether, a hexahydric polyether or trimethylolpropane.

9. The thermosetting one-pack coating composition according to claim 8, wherein the average number of isocyanate functional groups is from 5 to 8.

10. The thermosetting one-pack coating composition according to claim 1, wherein said hardener component (B) further comprises a compound having a semicarbazide group represented by formula (2):

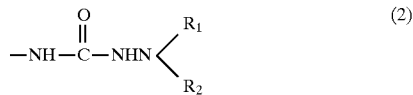

wherein each of $R_1$ and $R_2$ independently represents a $C_1$–$C_{20}$ alkyl group.

11. The thermosetting one-pack coating composition according to claim 10, wherein each of $R_1$ and $R_2$ is a methyl group.

12. The thermosetting one-pack coating composition according to claim 1, wherein said hardener component (B) further comprises at least two different components selected from the following components (a) to (c):

(a) a compound having a semicarbazide group represented by formula (2):

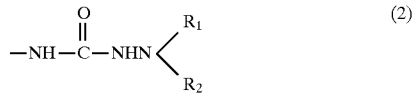

wherein each of $R_1$ and $R_2$ independently represents a $C_1$–$C_{20}$ alkyl group, (b) a divalent organotin compound; and (c) a phosphorous ester.

13. The thermosetting one-pack coating composition according to claim 12, wherein each of $R_1$ and $R_2$ is a methyl group.

14. The thermosetting one-pack coating composition according to claim 12, wherein said semicarbazide group of said component (a) is an N,N-dimethylsemicarbazide group and said component (b) is a tin alkanoate.

15. The thermosetting one-pack coating composition according to claim 14, wherein said component (b) is tin 2-ethylhexanoate.

16. The thermosetting one-pack coating composition according to claim 1, wherein said hardener component (B) further comprises a compound containing a semicarbazide group represented by formula (2) and a thermally dissociative blocked polyisocyanate group in one molecule:

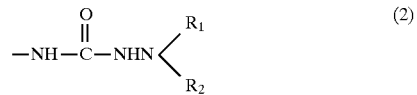

wherein each of $R_1$ and $R_2$ independently represents a $C_1$–$C_{20}$ alkyl group.

17. The thermosetting one-pack coating composition according to claim 16, wherein each of $R_1$ and $R_2$ is a methyl group.

* * * * *